3,520,919
HOMOCYCLIC COMPOUNDS
Albert Frederick Crowther and Leslie Harold Smith, Macclesfield, England, assignors to Imperial Chemical Industries Limited, London, England, a corporation of Great Britain
No Drawing. Continuation-in-part of application Ser. No. 323,089, Nov. 12, 1963. This application June 5, 1967, Ser. No. 643,356
Claims priority, application Great Britain, Nov. 23, 1962, 44,357/62
Int. Cl. C07c 93/26
U.S. Cl. 260—477                     3 Claims

ABSTRACT OF THE DISCLOSURE

The disclosure relates to O-acyl naphthoxypropanolamine derivatives which possess β-adrenergic blocking, anticonvulsant, sedative and tranquillising activity. Representative of the compounds disclosed is 1-isopropylaminomethyl-2-(1-naphthoxy)ethyl acetate hydrochloride.

This application is a continuation-in-part of Ser. No. 323,089 filed Nov. 12, 1963, now U.S. Pat. 3,337,628.

This invention relates to new naphthalene derivatives which possess β-adrenergic blocking activity, anticovulsant activity, sedative activity, and tranquillising activity.

According to the invention we provide naphthalene derivatives of the formula:

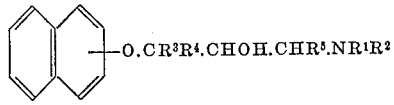

$$-O.CR^3R^4.CHOH.CHR^5.NR^1R^2$$

wherein $R^1$ stands for hydrogen or an alkyl, cycloalkyl, alkenyl, aralkyl or alkanoyl radical, any of which may optionally be substituted, $R^2$ stands for hydrogen or an alkyl, cycloalkyl, alkenyl, alkynyl or aralkyl radical, any of which may optionally be substituted, or $R^1$ and $R^2$ are joined together with the adjacent nitrogen atom to form a heterocyclic radical, optionally substituted, wherein $R^3$, $R^4$ and $R^5$, which may be the same or different, stand for hydrogen or alkyl radicals, and wherein the naphthalene nucleus may optionally bear one or more additional substituents, and the esters thereof, and the salts thereof, but excluding 1-amino-, 1-n-propylamino-, 1-n-butylamino-, 1-diethylamino-, 1-di-n-propylamino-, 1-di-isopropylamino-, 1-di-n-butylamino, 1-morpholino- and 1-piperidino-3-(1-naphthoxy)-2-propanol, and 1-ethyl-amino-, 1-dimethylamino-, 1-diethylamino-, 1-morpholino- and 1-piperidino-3-(2-naphthoxy)-2-propanol, and 1-(1-chloro-2-naphthoxy)-3-piperidino-2-propanol, and the esters thereof, and the salts thereof.

A preferred group of compounds of the invention comprises those of the said naphthalene derivatives wherein $R^1$, $R^3$, $R^4$ and $R^5$ stand for hydrogen, $R^2$ has the meaning stated above, and wherein the naphthalene nucleus may optionally bear one or more additional substituents, and the esters thereof, and the salts thereof, but excluding 1-amino-, 1-n-propylamino- and 1-n-butylamino-3-(1-naphthoxy)-2-propanol, and 1-ethylamino-3-(2-naphthoxy)-2-propanol, and the esters thereof, and the salts thereof.

As a suitable value for $R^1$ there may be mentioned, for example, an alkyl or hydroxyalkyl radical of not more than 5 carbon atoms, for example the methyl, ethyl, s-butyl or 2-hydroxyethyl radical, or an aralkyl radical of not more than 10 carbon atoms, for example the benzyl radical, or an alkanoyl radical of not more than 6 carbon atoms, for example the acetyl radical.

As a suitable value for $R^2$ there may be mentioned, for example, an alkyl radical of not more than 20 carbon atoms, for example the methyl, ethyl, n-propyl, isopropyl, n-butyl, isobutyl, s-butyl, t-butyl, 1-methyloctyl or 1-methylhexadecyl radical, or an alkyl radical of not more than 20 carbon atoms bearing one or more hydroxy radicals or substituted amino radicals, for example alkylamino, dialkylamino or heterocyclic radicals, for example alkylamino or dialkylamino radicals of not more than 6 carbon atoms or heterocyclic radicals of not more than 6 ring atoms, for example the dimethylamino or morpholino radical, or alkoxy radicals, for example alkoxy radicals of not more than 5 carbon atoms, for example the methoxy or n-propoxy radical, or alkoxyalkoxy radicals, for example alkoxyalkoxy radicals of not more than 10 carbon atoms, for example the 2-n-butoxyethoxy radical, or aryloxy radicals, optionally substituted, for example aryloxy radicals of not more than 10 carbon atoms, optionally substituted, for example the 4-chlorophenoxy or 2,4-dichlorophenoxy radical. Alternatively, $R^2$ may stand for an aralkyl radical of not more than 15 carbon atoms, optionally substituted with, for example, one or more alkoxy radicals, for example alkoxy radicals of not more than 5 carbon atoms, for example the methoxy radical. Thus, specific values for $R^2$ when it stands for a substituted alkyl radical or a substituted or unsubstituted aralkyl radical are, for example, the 2-hydroxyethyl, 2-hydroxy-1-methylethyl, 2-hydroxy-1,1-dimethylethyl, 2-n-propoxyethyl, 3-methoxypropyl, 2-(2-n-butoxyethoxy)-ethyl, 3-morpholinopropyl, 3-dimethylaminopropyl, 2-(4-chlorophenoxy)-ethyl, 2-(2-4-dichlorophenoxy)ethyl, benzyl, 1-methyl-2-phenylethyl, 1-methyl-3-phenylpropyl, 1,1-dimethyl-3-phenylpropyl, 4-methoxybenzyl, 3-(4-methoxyphenyl)-1-methylpropyl or 2-(3,4-dimethoxyphenyl)-ethyl radical. Alternatively, $R^2$ may stand for a cycloalkyl, alkenyl or alkynyl radical of not more than 10 carbon atoms, for example the cyclopentyl, allyl or 1-methyl-2-propynyl radical.

As a suitable value for the group —$NR^1R^2$ when it stands for a heterocyclic radical there may be mentioned, for example, a 5- or 6-membered nitrogen-containing heterocyclic radical, optionally substituted, for example a pyrrolidino, piperidino or morpholino radical, any of which may optionally be substituted by one or more alkyl radicals of not more than 5 carbon atoms, for example the methyl radical.

As a suitable value for $R^3$, $R^4$, or $R^5$ when it stands for an alkyl radical there may be mentioned, for example, an alkyl radical of not more than 5 carbon atoms, for example the methyl radical.

As suitable optional additional substitutents in the naphthalene nucleus there may be mentioned, for example, halogen atoms, for example chlorine or bromine atoms, or alkyl or hydroxy-alkyl radicals of not more than 5 carbon atoms, for example the methyl or 1-hydroxyethyl radical, or acyl radicals, for example alkanoyl radicals of not more than 6 carbon atoms, for example the acetyl radical, or sulphamoyl radicals, optionally substituted, for example dialkylsulphamoyl radicals of not more than 10 carbon atoms, for example the dimethylsulphamoyl radical.

Particularly valuable naphthalene derivatives of the present invention are, for example, 1-isopropylamino-3-(1-naphthoxy)-2-propanol,
1-t-butylamino-3-(1-naphthoxy)-2-propanol,
1-(2-hydroxy-1,1-dimethylethylamino)-3-(1-naphthoxy)-2-propanol,
1-(1-methyl-3-phenylpropylamino)-3-(1-naphthoxy)-2-propanol,
1-s-butylamino-3-(1-naphthoxy)-2-propanol, 1-(1-methyloctylamino)-3-(1-naphthoxy)-2-propanol,
1-(1,1-dimethyl-3-phenylpropylamino)-3-(1-naphthoxy)-2-propanol,
1-allylamino-3-(1-naphthoxy)-2-propanol,
1-cyclopentylamino-3-(1-naphthoxy)-2-propanol,
1-isopropylamino-3-(4-methyl-1-naphthoxy)-2-propanol and
1-[3-(4-methoxyphenyl)-1-methylpropylamino]-3-(1-naphthoxy)-2-propanol, and the esters thereof, and the salts thereof.

As suitable esters of the said naphthalene derivatives there may be mentioned, for example, O-esters derived from acids of the formula $R^6.COOH$ wherein $R^6$ stands for an alkyl, alkenyl or aryl radical, optionally substituted, for example an alkyl or alkenyl radical of not more than 20 carbon atoms or an aryl radical of not more than 10 carbon atoms, for example the methyl, pentadecyl, heptadecyl, heptadeca-8-enyl or phenyl radical.

As suitable salts of the said naphthalene derivatives there may be mentioned acid-addition salts, for example salts derived from inorganic acids, for example hydrochlorides, hydrobromides, phosphates, or sulphates, or salts derived from organic acids, for example oxalates, lactates, tartrates, acetates, salicylates, citrates, benzoates, naphthoates, o-acetoxybenzoates, adipates, maleates or 1,1-methylene-bis-2-hydroxy-3-naphthoates or salts with acidic synthetic resins, for example sulphonated polystyrene resins, for example "Zeo–Karb" 225 ("Zeo–Karb" is a trademark). Relatively insoluble salts, for example the 1,1'-methylene-bis-2-hydroxy-3-naphthoates, are useful in that they afford prolonged blood levels of the medicament.

According to a further feature of the invention we provide a process for the manufacture of the naphthalene derivatives of the invention which comprises the interaction of a halogeno compound of the formula:

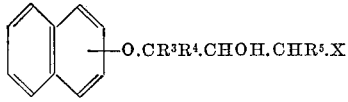

wherein X stands for a halogen atom, $R^3$, $R^4$ and $R^5$ have the meanings stated above, and the naphthalene nucleus may optionally bear one or more additional substituents, with an amine of the formula $NHR^1R^2$, wherein $R^1$ and $R^2$ have the meanings stated above.

As a suitable value for X there may be mentioned, for example, a chlorine or bromine atom. The said interaction may be conveniently accelerated or completed by the application of heat.

According to a further feature of the invention we provide a process for the manufacture of the naphthalene derivatives of the invention which comprises the interaction of an epoxide of the formula:

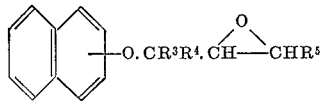

wherein $R^3$, $R^4$ and $R^5$ have the meanings stated above and the naphthalene nucleus may optionally bear one or more additional substituents, with an amine of the formula $NHR^1R^2$, wherein $R^1$ and $R^2$ have the meanings stated above.

This process may be carried out in a diluent or solvent, for example ethanol, and it may be accelerated or completed by the application of heat.

According to a further feature of the invention we provide a process for the manufacture of the naphthalene derivatives of the invention which comprises the interaction of a naphthol derivative of the formula:

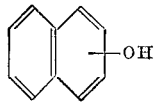

wherein the naphthalene nucleus may optionally bear one or more additional substituents, with a compound of the formula:

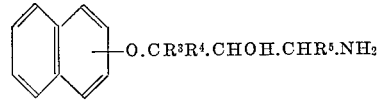

wherein $R^1$, $R^2$, $R^3$, $R^4$, $R^5$ and X have the meanings stated above.

The interaction involving a naphthol derivative and a halogeno derivative may be conveniently carried out in the presence of an acid-binding agent; alternatively, an alkali metal derivative of the naphthol derivative, for example the sodium or potassium derivative, may be used as starting material.

According to a further feature of the invention we provide a process for the manufacture of those of the naphthalene derivatives of the invention wherein $R^1$ stands for hydrogen and $R^2$ stands for a radical of the formula $-CHR^7R^8$, wherein $R^7$ stands for hydrogen or an alkyl, cycloalkyl, alkenyl, alkynyl, aryl or aralkyl radical, optionally substituted, and $R^8$ stands for an alkyl, cycloalkyl, alkenyl, alkynyl, aryl or aralkyl radical, optionally substituted, or wherein $R^7$ and $R^8$ are joined together with the adjacent carbon atom to form a cycloalkyl radical, optionally substituted, which comprises the interaction of an amino derivative of the formula:

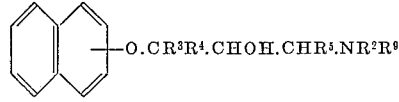

wherein $R^3$, $R^4$ and $R^5$ have the meanings stated above and the naphthalene nucleus may optionally bear one or more additional substituents, with a carbonyl compound of the formula $R^7.CO.R^8$, wherein $R^7$ and $R^8$ have the meanings stated above, under reducing conditions.

Suitable reducing conditions are those provided by the presence of hydrogen and a hydrogenation catalyst, for example platinum, in an inert diluent or solvent, for example ethanol, and/or in the case where, in the said carbonyl compound used as starting material, $R^7$ stands for an alkyl, cycloalkyl, alkenyl, alkynyl, aryl or aralkyl radical, optionally substituted, in an excess of the carbonyl compound used as starting material; or by the presence of an alkali metal borohydride, for example sodium borohydride, in an inert diluent or solvent, for example aqueous methanol, and/or in an excess of the carbonyl compound used as starting material. It is to be understood that, in the case where $R^7$ or $R^8$ or both stands or stand for an alkenyl or alkynyl radical, optionally substituted, if it is desired that this radical is not reduced to the corresponding alkyl radical or substituted alkyl radical during this process, suitable reducing conditions, for example those provided by the use of sodium borohydride, must be used. It is to be further understood that the amino derivatives used as starting materials may be generated in situ, for example by reduction of the corresponding α-diazoketone, α-azido-ketone and -alcohol, α-hydroxyiminoketone, α-nitro-ketone, and -alcohol, cyanhydrin or acyl cyanide.

According to a further feature of the invention we provide a process for the manufacture of those of the naphthalene derivatives of the invention wherein $R^1$ stands for hydrogen, which comprises the hydrogenolysis of a compound of the formula:

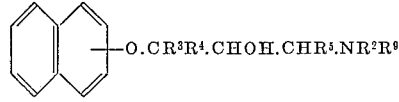

wherein $R^2$, $R^3$, $R^4$ and $R^5$ have the meanings stated above, $R^9$ stands for a hydrogenolysable radical, and the naphthalene nucleus may optionally bear one or more additional substituents.

As a suitable value for $R^9$ there may be mentioned an α-arylalkyl radical of not more than 10 carbon atoms, for example the benzyl radical. The said hydrogenolysis may be effected by catalytic hydrogenation, for example hydrogenation in the presence of a platinum or palladium-on-carbon catalyst, conveniently in an inert diluent or solvent, for example ethanol.

According to a further feature of the invention we provide a process for the manufacture of those of the naphthalene derivatives of the invention wherein the naphthalene nucleus bears as substituent a hydroxyalkyl radical, which comprises the reduction of the corresponding compound wherein the naphthalene nucleus bears as substituent the corresponding oxoalkyl radical. As a suitable oxoalkyl radical there may be mentioned, for example, an oxoalkyl radical of not more than 20 carbon atoms, for example an alkanoyl radical of not more than 20 carbon atoms, for example the acetyl radical. As a suitable reducing agent there may be mentioned, for example, sodium borohydride.

According to a further feature of the invention we provide a process for the manufacture of the esters of the invention which comprises the acylation of the corresponding naphthalene derivative. As suitable acylating agents there may be mentioned, for example, acyl halides or acid anhydrides, for example acetic anhydride or benzoyl chloride. The acylation may be carried out in a diluent or solvent, which, in the case where an acid anhydride is used, may conveniently be the acid from which the anhydride is derived.

According to a further feature of the invention we provide a process for the manufacture of those of the naphthalene derivatives of the invention wherein $R^1$ stands for an alkanoyl radical, which comprises the isomerisation of an ester of the formula:

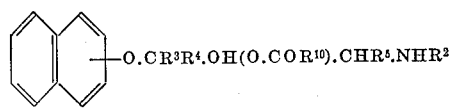

wherein $R^2$, $R^3$, $R^4$ and $R^5$ have the meanings stated above and $R^{10}$ stands for an alkyl radical, for example an alkyl radical of not more than 5 carbon atoms, and wherein the naphthalene nucleus may optionally bear one or more additional substitutents.

The isomerisation may be effected by the interaction of the ester with a strong base, for example an alkali metal hydroxide, for example sodium hydroxide, conveniently in a diluent or solvent, for example methanol.

The invention is illustrated but not limited by the following examples in which the parts are by weight:

EXAMPLE 1

A mixture of 4.4 parts of 1-chloro-3-(1-naphthoxy)-2-propanol and 16 parts of isopropylamine is heated in a sealed vessel at 70–80° C. for 10 hours. The vessel is cooled and to the contents there are added 50 parts of water. The mixture is acidified with 2 N-hydrochloric acid, and washed with 50 parts of ether. The aqueous phase is decolourised with carbon, and then added to 50 parts of 2 N-sodium hydroxide solution at 0° C. The mixture is filtered. The solid residue is washed with water, dried, and crystallised from cyclohexane. There is thus obtained 1-isopropylamino-3-(1-naphthoxy)-2-propanol, M.P. 96° C.

The above procedure is repeated using the appropriate chlorohydrins and amines as starting materials except that a reaction temperature of 90–100° C. is used. In a similar manner there are obtained the compounds listed in the following table. The hydrochlorides and oxalates listed are obtained by dissolving the base in ether, adding an ethereal solution of hydrogen chloride or oxalic acid, filtering the mixture, washing the solid residue with ether, and drying. The picrates listed are obtained by dissolving the base in ethanol, adding an ethanolic solution of picric acid, filtering the mixture, washing the solid residue with ethanol, and drying.

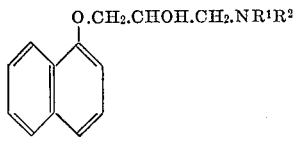

$O.CH_2.CHOH.CH_2.NR^1R^2$

| $R^1$ | $R^2$ | Additional substituents in naphthalene nucleus | Base or salt | M.P., ° C. | Crystallisation solvent(s) |
|---|---|---|---|---|---|
| H | t-Butyl | | Hydrogen oxalate | 230 | Aqueous ethanol. |
| H | 2-hydroxy-1,1-dimethylethyl | | Base | 148 | Ethanol. |
| H | Isobutyl | | Hydrochloride | 166–168 | Water. |
| H | Isopropyl | 4-chloro | Hydrogen oxalate | 186–188 | Ethanol. |
| H | Ethyl | | Base | 109–110 | Cyclohexane. |
| H | s-Butyl | | do | 60. 5–61 | Hexane. |
| Methyl | Methyl | | do | 82–83 | Pet. ether, 60° C./80° C. |
| Methyl | Isopropyl | | Picrate | 120–122 | Ethanol. |
| H | 2-hydroxyethyl | | Base | 84 | Hexane. |
| Ethyl | do | | Picrate | 157–158 | Ethanol. |
| 2-hydroxyethyl | do | | do | 161–163 | Do. |
| H | 3-morpholinopropyl | | Base | 89–91 | Cyclohexane. |
| H | 2-(3,4-dimethoxyphenyl) ethyl | | Hydrogen oxalate | 209 | Water/propanol. |
| H | Isopropyl | 4-methyl | Base | 90–91 | Cyclohexane. |
| H | do | 5-dimethylsulphamoyl | Hydrochloride | 190–193 | Butanol. |
| H | do | 5,8-dichloro | Base | 115 | Cyclohexane. |
| s-Butyl | s-Butyl | | Hydrogen oxalate | 160–161 | Ethanol. |
| H | 2-propoxyethyl | | Hydrochloride | 105–107 | Ethyl acetate. |
| H | Benzyl | | do | 169 | Ethyl acetate/ethanol. |
| H | Allyl | | do | 148 | Do. |

EXAMPLE 2

By the use of 1-chloro-3-(2-naphthoxy)-2-propanol in place of the 1-chloro-3-(1-naphthoxy)-2-propanol used in Example 1 there is obtained similarly 1-isopropylamino-3-(2-naphthoxy)-2-propanol, M.P. 138–140° C. (crystallised from ethanol.)

By the use of t-butylamine in place of the isopropylamine used in Example 2 there is obtained similarly 1-t-butylamino-3-(2-naphthoxy)-2-propanol, M.P. 120° C. (from cyclohexane).

EXAMPLE 3

A mixture of 2.3 parts of 1-chloro-3-(1-naphthoxy)-2-propanol and 2.6 parts of 1-methyl-3-phenylpropylamine is heated at 90–100° C. for 10 hours. The mixture is then cooled, diluted with 50 parts of water, acidified with 2 N-hydrochloric acid and filtered. The solid residue is shaken with 50 parts of 2 N sodium hydroxide solution and 50 parts of ether. The mixture is separated, and the ethereal phase is dried over anhydrous magnesium sulphate, filtered and evaporated. The residue is dissolved in 50 parts of ethyl acetate, and a solution of hydrogen chloride in ether is added. The mixture is filtered, and the solid residue is washed with ethyl acetate, dried, and crystallised from a mixture of methanol and ethyl acetate. There is thus obtained 1-(1-methyl-3-phenylpropylamino) - 3 - (1-naphthoxy) - 2 - propanol hydrochloride, M.P. 162–164° C.

EXAMPLE 4

A mixture of 1.84 parts of 1,2-epoxy-3-naphthoxypropane and 1.7 parts of isopropylamine is heated under reflux for 16 hours. The mixture is acidified with 25 parts of 2 N-hydrochloric acid and washed with 50 parts of ether. The aqueous solution is then added to 50 parts of 2 N-sodium hydroxide solution at 0° C., and the resulting mixture is filtered. The solid residue is washed with water, and dried, and then crystallised from cyclohexane. There is thus obtained 1-isopropylamino-3-(1-naphthoxy)-2-propanol, M.P. 96° C.

The base may be converted into the hydrochloride as follows:

4.65 parts of the base are dissolved in 30 parts of warm acetone. To the warm solution there are added 2 parts of 10 N-hydrochloric acid. The mixture is allowed to cool, and is then filtered. The solid residue is washed with acetone and then dried. The solid is crystallised from propanol, and there is thus obtained 1-isopropylamino-3-(1-naphthoxy)-2-propanol hydrochloride, M.P. 163° C.

The above procedure is repeated using the appropriate epoxy-naphthoxy-propanes and amines as starting materials, except that various reaction temperatures and times are used and in a similar manner there are obtained the compounds listed in the following table. The hydrochlorides, oxalates and picrates are obtained by the general procedures described in Example 1.

pressure. The residue is dissolved in ethyl acetate, and ethereal hydrochloric acid is added until no more solid is precipitated. The mixture is filtered. The solid residue is washed with ethyl acetate, and then dried. The solid is crystallised from n-propanol and there is thus obtained 1-isopropylamino-3-(1-naphthoxy) - 2 - propanol hydrochloride, M.P. 163–164° C.

By using a mixture of 2.8 parts of heptyl methyl ketone and 40 parts of ethanol in place of the 80 parts of acetone there is obtained similarly 1-(1-methyloctylamino)-3-(1-naphthoxy)-2-propanol hydrochloride, M.P. 116–118 ° C. (crystallised from ethyl acetate).

EXAMPLE 6

A mixture of 2.5 parts of 2-bromo-4-(1-naphthoxy)-3-butanol and 10 parts of isopropylamine is heated in a pressure vessel at 100° C. for -10 hours. The mixture is then evaporated under reduced pressure and the residue is acidified with 25 parts of 2 N-hydrochloric acid. Carbon is added, and the mixture is stirred and then filtered. The filtrate is added to 50 parts of 2 N-sodium hydroxide solution, and the resulting mixture is then extracted with 50 parts of ether. The ethereal extract is dried over anhydrous magnesium sulphate, and then filtered and the filtrate is acidified with ethereal hydrochloric acid. The resulting mixture is filtered, and the solid residue is crystallised from a mixture of ethyl acetate and ethanol. There is thus obtained 2-isopropyamino-4-(-naphthoxy)-3-butanol hydrochloride, M.P. 210–212° C.

The 2-bromo-4-(1-naphthoxy)-3-butanol used as starting material may be obtained as follows:

To a stirred solution of 3 parts of 2-bromo-4-(1-naphthoxy)-3-butanone in 20 parts of methanol at −5° C. there is added 0.5 part of sodium borohydride. The mixture is stirred for 2 hours at 0° C., and is then poured into 100 parts of ice. There are then added 50 parts of ether, and the resulting mixture is separated. The ethereal phase is dried over anhydrous magnesium sulphate and then evaporated. The residue consists of 2-bromo-4-(1-naphthoxy)-3-butanol. 2-bromo-4-(1-naphthoxy)-3-butanone itself may be obtained as follows:

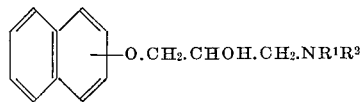

| R¹ | R² | Position of attachment of main substituent | Additional substituents in naphthalene nucleus | Reaction temp., °C. | Reaction time, hours | Base or salt | M.P., °C. | Crystallisation solvent (s) |
|---|---|---|---|---|---|---|---|---|
| Ethyl | Butyl | 1 | None | 100 | 1 | Hydrogen oxalate | 100 | Ethanol/ethyl acetate. |
| H | 2-hydroxy-1-methylethyl | 1 | do | 100 | 1 | Base | 115 | Benzene. |
| H | 3-methoxypropyl | 1 | do | 100 | 1 | Hydrogen oxalate | 148–149 | Propanol. |
| H | 2-(2-butoxyethoxy)ethyl | 1 | do | 100 | 1 | do | 138 | Water. |
| H | -(2,4-dichlorophenoxy)-ethyl | 1 | do | 100 | 1 | Base | 115 | Pet. ether, 100° C./120°C. |
| Ethyl | 2-(4-chlorophenoxy)ethyl | 1 | do | 100 | 1 | Hydrogen oxalate | 149–150 | Water. |
| H | 3-dimethylaminopropyl | 1 | do | 20 | 72 | Dihydrochloride | 234–235 | Methanol. |
| H | 1,1-dimethyl-3-phenylpropyl | 1 | do | 100 | 1 | Oxalate | 210–211 | 2-ethoxyethanol. |
| Benzyl | 1-methyl-2-propynyl | 1 | do | 100 | 1 | Picrate | 166–168 | Propanol. |
| H | Isopropyl | 1 | 2-chloro | 20 | 16 | Hydrochloride | 160–161 | Ethanol/ethyl acetate. |
| H | do | 1 | 4-acetyl | 20 | 16 | Base | 95 | Pet. ether 100° C./120° C. |
| H | do | 1 | 2,4-dichloro | 30 | 3 | Hydrochloride | 194–195 | Propanol/ethyl acetate. |
| H | 2-hydroxy-1,1-dimethylethyl | 2 | None | 100 | 1 | Base | 80–81 | Pet. ether 100° C./120° C. |
| H | Allyl | 2 | do | 53 | 1 | Hydrochloride | 182 | Ethanol/ethyl acetate. |

EXAMPLE 5

2.5 parts of 1-amino-3-(1-naphthoxy)-2-propanol hydrochloride is added to a mixture of 100 parts of 2 N-sodium hydroxide solution and 200 parts of ethylacetate. The mixture is shaken and separated. The ethyl acetate layer is dried over anhydrous magnesium sulphate, filtered and evaporated. The residue is dissolved in 80 parts of acetone, and 0.5 part of platinum oxide is added. The mixture is shaken at ambient temperature and atmospheric pressure for 12 hours. The mixture is then filtered, and the filtrate is evaporated to dryness under reduced To a stirred solution of 13 parts of diazoethane in 300 parts of ether at −10° C. there is added a solution of 10 parts of 1-naphthoxyacetyl chloride in 150 parts of ether. The mixture is stirred at 0° C. for 3 hours, and then at ambient temperature for 18 hours. The mixture is then stirred and cooled to −5° C., and 20 parts of 40% hydrobromic acid are added. The mixture is stirred at −5° C. for 30 minutes. The mixture is separated, and the ethereal phase is dried over anhydrous magnesium sulphate. The mixture is filtered and the filtrate is evaporated under reduced pressure. The residue is extracted with 20 parts of cyclohexane, and the extract is filtered. The filtrate is evaporated under reduced pressure; the residue consists of 2-bromo-4-(1-naphthoxy)-3-butanone.

EXAMPLE 7

A solution of 0.46 part of sodium in 20 parts of ethanol is added to 2.42 parts of 1-chloro-3-(N-benzyl-N-isopropylamino)-2-propanol, and to this mixture 1.44 parts of 1-naphthol are added. The mixture is heated under pressure in a sealed tube at 100° C. during 10 hours, and then evaporated to dryness under reduced pressure. The residue is stirred together with 50 parts of 2 N-hydrochloric acid and 50 parts of ether. The mixture is separated and the aqueous layer is basified by the addition of 2 N-sodium hydroxide solution. The alkaline solution is extracted three times with 100 parts of ether. The combined ethereal extracts are washed twice with 50 parts of water, dried over anhydrous magnesium sulphate, and the ether is then removed by distillation. There is thus obtained 1-(N-benzyl-N-isopropylamino)-3-(1 - naphthoxy)-2-propanol, which, by means of the procedure described in Example 1, may be converted into a picrate, M.P. 157–8° C., containing one molecule of water of crystallisation (crystallised from aqueous dimethylformamide). The free base may be regenerated from the purified picrate as follows:

2 parts of the picrate are suspended in 100 parts of ethyl acetate, and this suspension is stirred together with 100 parts of 50% ammonia solution. When all the picrate has dissolved, the resulting mixture is separated. The organic layer is then extracted, each time with 50 parts of 50% ammonia solution, until the extracts are practically colourless. The ethyl acetate solution is then washed twice with 50 parts of water, dried over anhydrous magnesium sulphate, and the ethyl acetate is then removed by distillation. There is thus obtained 1-(N-benzyl-N-isopropylamino)-3-(1-naphthoxy)-2-propanol.

EXAMPLE 8

1 part of 1-(N-benzyl-N-isopropylamino)-3-(1-naphthoxy)-2-propanol is dissolved in 35 parts of ethanol. To the solution are added 2 parts of a saturated ethereal hydrogen chloride solution and 0.4 part of a 20% palladium on carbon catalyst. The mixture is shaken at ambient temperature and atmospheric pressure in an atmosphere of hydrogen until sufficient hydrogen has been absorbed to account for the hydrogenolysis of the benzyl group, and no further uptake of hydrogen is occurring. The mixture is filtered and the filtrate is evaporated to dryness under reduced pressure. The residue is crystallised from n-propanol, and there is thus obtained 1-isopropylamino-3-(1-naphthoxy)-2-propanol hydrochloride, M.P. 163–164° C.

EXAMPLE 9

A mixture of 1.25 parts of 1-amino-3-(1-naphthoxy)-2-propanol hydrochloride, 1.34 parts of benzyl methyl ketone, 40 parts of ethanol and 0.1 part of platinum oxide is shaken in an atmosphere of hydrogen at ambient temperature and atmospheric pressure until hydrogen absorption ceases. The mixture is filtered and the filtrate is evaporated to dryness under reduced pressure. 25 parts of acetone are added to the residue, and the resulting mixture is filtered. The solid residue is washed with acetone, dried, and crystallised from a mixture of ethanol and ethyl acetate. There is thus obtained 1-(1-methyl-2-phenylethylamino - 3 - (1-naphthoxy)-2-propanol hydrochloride, M.P. 186° C.

By using 1.25 parts of 2-(4-methoxyphenyl)ethyl methyl ketone in place of the 1.34 parts of benzyl methyl ketone there is similarly obtained 1-[3-(4-methoxyphenyl)-1-methylpropylamino]-3-(1 - naphthoxy)-2-propanol hydrochloride, M.P. 176–178° C. (crystallised from ethanol).

By using 0.84 part of cyclopentanone in place of the 1.34 parts of benzyl methyl ketone there is similarly obtained 1-cyclopentylamino-3-(1-naphthoxy) - 2 - propanol hydrochloride, M.P. 208–209° C. (crystallised from ethanol).

By using 2.5 parts of 2-heptadecanone in place of the 1.34 parts of benzyl methyl ketone there is similarly obtained 1-(1 - methylhexadecylamino)-3-(1-naphthoxy)-2-propanol hydrochloride, M.P. 105–106° C. (crystallised from ethyl acetate).

By using 1.36 parts of anisaldehyde in place of the 1.34 parts of benzyl methyl ketone there is similarly obtained 1 - (4 - methoxybenzylamino)-3-(1 - naphthoxy)-2-propanol hydrochloride, M.P. 190–192° C. with decomposition (crystallised from ethanol).

EXAMPLE 10

A mixture of 2 parts of 1,2-epoxy-3-(2-naphthoxy)-propane and 5 parts of 1-methyl-3-phenylpropylamine is heated at 100° C. for 1 hour. The mixture is then cooled and stirred together with 25 parts of 2 N-hydrochloric acid and 50 parts of ether. The ethereal and aqueous phases are decanted, and the residue is crystallised from a mixture of ethanol and ethyl acetate. There is thus obtained 1 - (1 - methyl - 3 - phenylpropylamino)-3-(2-naphthoxy)-2-propanol hydrochloride, M.P. 174–176° C.

EXAMPLE 11

6.6 parts of 1-chloro-2-naphthol, 20 parts of epichlorohydrin and 0.1 part of piperidine are refluxed together for 6 hours. The mixture is then evaporated to remove unreacted epichlorohydrin. To the residue there are added 8 parts of isopropylamine, and the mixture is heated under reflux for 10 hours. The mixture is then evaporated and the residue is heated together with 80 parts of petroleum ether (B.P. 80–100° C.). The solution thus obtained is cooled and filtered. The solid residue is washed with petroleum ether (B.P. 80–100° C.) and dried, and is then crystallised from petroleum ether (B.P. 80–100° C.). There is thus obtained 1-(1-chloro-2-naphthoxy)-3-isopropylamino-2-propanol, M.P. 104° C.

By the use of 5 parts of 1-methyl-2-naphthol in place of the 6.6 parts of 1-chloro-2-naphthol there may be obtained in a similar manner 1-isopropylamino-3-(1-methyl-2-naphthoxy)-2-propanol, M.P. 122° C. [crystallised from petroleum ether (B.P. 80–100° C.)].

EXAMPLE 12

A mixture of 0.3 part of 3-bromo-1-(1-naphthoxy)-2-propanol and 5 parts of isopropylamine is heated in a sealed vessel at 100° C. for 10 hours. The vessel is cooled, and to the contents there are added 10 parts of 2 N-hydrochloric acid. The mixture is filtered and the filtrate is basified with 2 N-sodium hydroxde solution and shaken together with 25 parts of ether. The mixture is separated and the ethereal phase is dried over anhydrous magnesium sulphate and then filtered. The filtrate is evaporated to dryness. The residue consists of 1-isopropylamino-3-(1-naphthoxy)-2-propanol, M.P. 96° C.

The 3-bromo-1-(1-naphthoxy)-2-propanol used as starting material may be obtained as follows:

A solution of 0.28 part of 3-bromo-1-(1-napthoxy)-acetone and 5 parts of methanol is stirred and cooled to 0° C. Whilst 0.25 part of sodium borohydried is added. The mixture is then stirred for a further 30 minutes at 0° C. The mixture is then poured onto ice, acidified with 2 N-hydrochloric acid and extracted with 20 parts of ether. The ethereal extract is dried over anhydrous magnesium sulphate and filtered, and the filtrate is evaporated to dryness. The residue consists of 3-bromo-1-(1-naphthoxy)-2-propanol. It possesses a characteristic absorption band in the infra-red at 3450 cm.$^{-1}$.

3-bromo-1-(1-naphthoxy)acetone itself may be obtained as follows:

A solution of 10 parts of 1-naphthoxyacetyl chloride in 150 parts of ether is stirred and cooled to −5 to −10° C. whilst there is added during 30 minutes a solution of 11 parts of diazomethane in 300 parts of ether. The solution is stirred for 2 hours at −5° C. and then for 18 hours at ambient temperature. The solution is then stirred and cooled to −10° C. whilst there are added 20 parts of 11 N-hydrobromic acid. The mixture is then stirred for 30 minutes. The mixture is separated and the ethereal phase is dried over anhydrous magnesium sulphate and filtered. The filtrate is evaporated to dryness, and the residue is crystallised from cyclohexane. There is thus obtained 3-bromo-1-(1-napthoxy)acetone, M.P. 92–94° C.

EXAMPLE 13

A mixture of 8 parts of 1-chloro-3-methyl-3-(1-naphthoxy)-2-butanol and 40 parts of isopropylamine is heated in a sealed vessel at 100° C. for 10 hours. The excess of isopropylamine is evaporated and then residue is dissolved in 100 parts of N-hydrochloric acid. The solution is washed with ether, and 20 parts of 8 N-sodium hydroxide solution are then added to the aqueous acid solution. The mixture is extracted with 100 parts of ether and the ethereal extract is washed with water and then dried with anhydrous magnesium sulphate. The ethereal solution is evaporated to dryness. The residual gum is dissolved in 30 parts of ether, and ethereal hydrogen chloride is added until the precipitation of solid is substantially complete. The mixture is filtered and the solid residue is crystallised from a mixture of methanol and ethyl acetate. There is thus obtained 1-isopropylamino-3-methyl-3-(2-naphthoxy)-2-butanol hydrochloride, M.P. 138–139° C.

The 1-chloro-3-methyl-3-(1-naphthoxy)-2-butanol used as starting material may be prepared as follows:

A solution of 68 parts of α-(1-naphthoxy)-isobutyric acid in 450 parts of chloroform and 53 parts of thionyl chloride is heated under reflux for 3 hours, and then the chloroform and the excess of thionyl chloride are evaporated. The residual gum is heated under reflux together with 600 parts of petroleum ether (B.P. 60–80° C.) and 5 parts of active carbon for 15 minutes. The mixture is cooled to ambient temperature and then filtered. The filtrate is evaporated to dryness, and there is thus obtained α-(1-napthoxy)isobutyryl chloride as an oil.

A solution of 70 parts of α-(1-naphthoxy)isobutyryl chloride in 200 parts of ether is treated with an excess of diazomethane in ether at 0° C. for 24 hours, and then the ether and the excess of diazomethane are evaporated. The residual gum is dissolved in 250 parts of ether, and hydrogen chloride gas is passed into the solution at 0° C. until the solution is saturated. The solution is stirred and 300 parts of ice are added gradually. The mixture is separated and the ethereal solution is washed successively three times with 100 parts of water each time, three times with 150 parts of 10% sodium carbonate solution each time and finally three times with 100 parts of water each time. The ethereal solution is dried with anhydrous magnesium sulphate and then evaporated. 10 parts of the residue are dissolved in 80 parts of methanol, the solution is stirred, and 5 parts of sodium borohydride are added during 45 minutes at 0° C. After 12 hours the methanol is evaporated and the residue is shaken together with 30 parts of ether and 20 parts of water. The mixture is separated, the ethereal solution is dried with anhydrous magnesium sulphate and then evaporated to dryness. There is thus obtained 1-chloro-3-methyl-3-(1-naphthoxy)-2-butanol as an oil.

EXAMPLE 14

The process of Example 13 is repeated using 40 parts of t-butylamine in place of 40 parts of isopropylamine. There is thus obtained 1-t-butylamino-3-methyl-3-(1-naphthoxy)-2-butanol hydrochloride, M.P. 219–220° C.

EXAMPLE 15

The procedure of Example 13 is repeated using 8 parts of 1-chloro-3-(1-naphthoxy)-2-butanol in place of 8 parts of 1-chloro-3-methyl-3-(1-naphthoxy)-2-butanol. There is thus obtained 1-isopropylamino-3-(1-naphthoxy)-2-butanol hydrochloride, M.P. 158–159° C.

The 1-chloro-3-(1-naphthoxy)-2-butanol used as starting material may be obtained as follows:

A solution of 20 parts of α-(1-naphthoxy)propionic acid in 300 parts of chloroform and 16.5 parts of thionyl chloride is heated under reflux for 3 hours, and then the chloroform and the excess of thionyl chloride are evaporated. The residual oil consists of α-(1-naphthoxy)propionyl chloride. A solution of 20 parts of this oil in 100 parts of ether is treated with an excess of diazomethane in ether at 0° C. for 16 hours, and then the ether and the excess of diazomethane are evaporated. The residual gum is dissolved in 150 parts of ether, and then hydrogen chloride gas is passed into the solution at 0° C. until the solution is saturated. The solution is stirred and 200 parts of ice are added gradually. The mixture is separated and the ethereal solution is washed successively three times with 50 parts of water each time, three times with 50 parts of 10% sodium carbonate solution each time, and finally three times with 50 parts of water each time. The ethereal solution is dried with anhydrous magnesium sulphate and then evaporated to give chloromethyl 1-(1-naphthoxy)ethyl ketone, M.P. 70–71° C. [crystallised from petroleum ether (B.P. 60–80° C.)].

15 parts of chloromethyl 1-(1-naphthoxy)ethyl ketone are dissolved in 200 parts of methanol, the solution is stirred at 0° C., and 7.5 parts of sodium borohydride are added during 45 minutes. After 12 hours the methanol is evaporated and the residue is shaken together with 50 parts of ether and 30 parts of water. The mixture is separated, and the ethereal solution is dried with anhydrous magnesium sulphate and then evaporated to dryness. There is thus obtained 1-chloro-3-(1-naphthoxy)-2-butanol as an oil.

EXAMPLE 16

A solution of 1.25 parts of 1-isopropylamino-3-(1-naphthoxy)-2-propanol and 1 part of acetic anhydride in 10 parts of acetic acid is kept at ambient temperature for 18 hours, and is then added to a mixture of 50 parts of ice and 10 parts of 11 N-ammonium hydroxide solution. The aqueous phase is decanted, and as much as possible of the residue is dissolved in 2 N-hydrochloric acid at 0° C. The solution is basified with 2 N-sodium hydroxide solution and then extracted with 50 parts of ether. The ethereal extract is dried over anhydrous magnesium sulphate, and filtered. To the filtrate there is added a saturated solution of oxalic acid in ether until precipitation is substantially complete. The mixture is filtered and the solid residue is crystallised from ethanol. There is thus obtained 1-isopropylaminomethyl-2-(1-naphthoxy)ethyl acetate as its hydrogen oxalate, M.P. 202–204° C.

In place of the oxalic acid there may be used hydrogen chloride and in a similar manner there is obtained 1-isopropylaminomethyl-2-(1-naphthoxy)ethyl acetate as its hydrochloride, M.P. 170–171° C. (crystallised from a mixture of ethanol and ethyl acetate).

EXAMPLE 17

A mixture of 2.95 parts of 1-isopropylamino-3-(1-naphthoxy)-2-propanol hydrochloride and 6 parts of benzoyl chloride are heated at 100° C. for 6 hours. The mixture is cooled, and there are then added 50 parts of ether. The mixture is kept at ambient temperature for 3 days and is then filtered. The solid residue is washed with ether, and crystallised from 25 parts of benzene. There is thus obtained 1-isopropylaminomethyl-2-(1-naphthoxy)ethyl benzoate as its hydrochloride, M.P. 130–132° C.

EXAMPLE 18

2 parts of sodium borohydride are added during 10 minutes to a stirred solution of 2 parts of 1-(4-acetyl-1-naphthoxy)-3-isopropylamino-2-propanol in 80 parts of methanol at 0° C. The mixture is stirred at 0° C. for 1 hour and then poured onto 100 parts of ice, acidified with 2 N-hydrochloric acid, and filtered. The filtrate is basified with 2 N-sodium hydroxide solution and extracted with 500 parts of ether. The ethereal extract is dried over anhydrous magnesium sulphate and then filtered. To the filtrate there is added a saturated solution of oxalic acid in ether until precipitation is substantially complete. The mixture is filtered, and the solid residue is crystallised from a mixture of ethanol and ether. There is thus obtained 1-(4-α-hydroxyethyl-1-naphthoxy)-3-isopropylamino-2-propanol hydrogen oxalate, M.P. 146–147° C. with decomposition.

EXAMPLE 19

A solution of 0.77 part of 1-isopropylaminomethyl-2-(1-naphthoxy)ethyl acetate hydrochloride in 16 parts of methanol is treated with 3.5 parts of N-sodium hydroxide at ambient temperature, and after 1 hour the methanol is evaporated under reduced pressure. The residue is shaken together with 20 parts of ether and 10 parts of N-hydrochloric acid. The mixture is separated and the ethereal solution is washed with water, dried over anhydrous magnesium sulphate and then evaporated to dryness. The residue is crystallised from a mixture of acetate and light-petroleum (B.P. 40–60° C.), and there is thus obtained N - acetyl-1-isopropylamino-3-(1-naphthoxy(-2-propanol, M.P. 91° C.

EXAMPLE 20

A solution of 29.5 parts of 1-isopropylamino-3-(1-naphthoxy)-2-propanol hydrochloride in 300 parts of water is added to a solution of 43.2 parts of disodium 1,1'-methylene-bis-(2-hydroxy-3-naphthoate) in 4000 parts of water. The mixture is filtered and the solid residue is washed with water and dried. The solid is crystalized from ethanol, and there is thus obtained di-[1-isopropylamino-3-(1 - naphthoxy)-2-propanol] 1,1' - methylene-bis-(2-hydroxy-3-naphthoate), M.P. 212° C.

EXAMPLE 21

A solution of 1.3 parts of 1-isopropylamino-3-(1-naphthoxy)-2-propanol in 25 parts of ethyl acetate is added to a solution of 0.7 part of benzoic acid in 5 parts of ether. The mixture is filtered and the solid residue is washed with ether and dried. There is thus obtained 1-isopropylamino-3-(1-naphthoxy)-2-propanol benzoate, M.P. 143–144° C. (crystallised from water).

By substituting 0.96 part of β-napthoic acid for the 0.7 part of benzoic acid there is similarly obtained 1-isopropyl-amino-3-(1-naphthoxy)-2-propanol β-naphthoate, M.P. 132° C. (crystallised from a mixture of cyclohexane and ethanol).

By substituting 0.98 part of o-acetoxybenzoic acid in place of the 0.7 part of benzoic acid there is similarly obtained 1-isopropylamino-3-(1-naphthoxy)-2-propanol o-acetoxybenzoate, M.P. 122–124° C. (crystallised from ethyl acetate).

By substituting 0.7 part of adipic acid in place of the 0.7 part of benzoic acid there is similarly obtained 1-isopropylamino-3-(1-naphthoxy)-2-propanol adipate, M.P. 145–147° C. (crystallised from a mixture of ethyl acetate and ethanol).

By substituting 0.6 part of maleic acid in place of the 0.7 part of benzoic acid there is similarly obtained 1-isopropylamino-3-(1-naphthoxy)-2-propanol maleate, M.P. 145–146° C. (crystallised from a mixture of ethyl acetate and ethanol).

By substituting 0.62 part of oxalic acid in place of the 0.7 part of benzoic acid there is similarly obtained 1-isopropylamino-3-(1-naphthoxy)-2-propanol oxalate, M.P. 180–182° C. (crystallised from a mixture of methanol and ethyl acetate).

EXAMPLE 22

To a stirred solution of 10 parts of 1-isopropylamino-3-(1-naphthoxy)-2-propanol hydrochloride in 100 parts of water there is added a suspension of 100 parts of a sulphonated polystyrene resin ["Zeo–Karb" 225 (SRC 9)—"Zeo–Karb" is a trademark] in the sodium form in 400 parts of water. The mixture is stirred for 60 minutes at ambient temperature and is then filtered. The solid residue is washed with water and dried at ambient temperature. There is thus obtained a complex salt of 1-isopropylamino-3-(1-naphthoxy)-2-propanol with the sulphonated polystyrene resin which has a base content of 9%.

As noted, the compounds described herein possess β-adrenergic blocking activity, anticonvulsant activity, sedative activity, and tranquillising activity. The compounds generally may be used orally in total daily dosages (per 70 kg. man) of about 60 mg. to 400 mg. although variations outside this range may also be used as understood in the art.

What we claim is:

1. A compound selected from the group consisting of compounds of the formula:

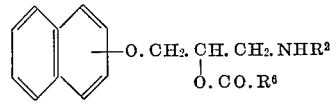

wherein $R^2$ stands for lower alkyl and $R^6$ stands for lower alkyl or phenyl, and the pharmaceutically acceptable acid-addition salts thereof.

2. A compound according to claim 1 selected from the group consisting of 1-isopropylaminomethyl-2-(1-naphthoxy)ethyl acetate and the pharmaceutically acceptable acid-addition salts thereof.

3. A compound according to claim 1 selected from the group consisting of 1-isopropylaminomethyl-2-(1-naphthoxy)ethyl benzoate and the pharmaceutically acceptable acid-addition salts thereof.

References Cited

UNITED STATES PATENTS 3,432,545 12/1968 Stevens _____ 260—501.18
3,415,873 3/1969 Howe _____ 260—501.17

LORRAINE A. WEINBERGER, Primary Examiner

E. J. GLEIMAN, Assistant Examiner

U.S. Cl. X.R.

260—490, 486; 424—309, 311